Dec. 15, 1970  W. B. INNES  3,547,587
MEANS AND METHODS OF RAPID GAS ANALYSIS
Filed Aug. 7, 1967  3 Sheets-Sheet 1

WILLIAM B. INNES
INVENTOR

BY Earl E. Moore
ATTORNEY

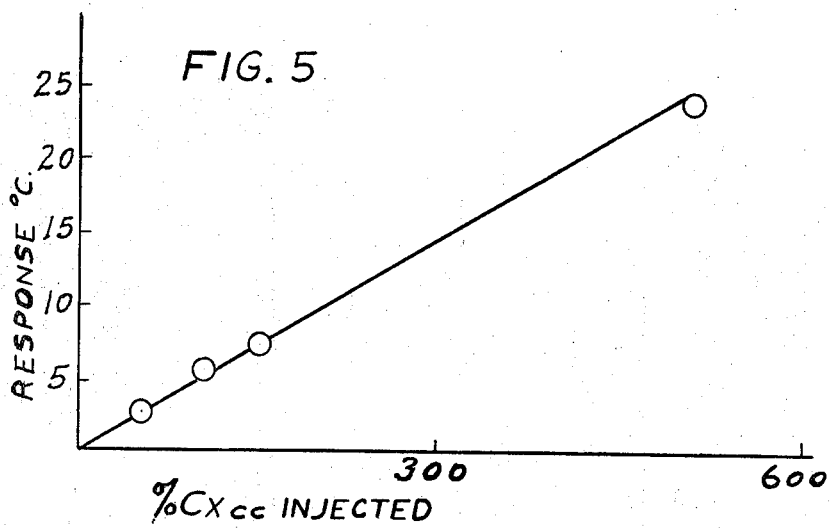
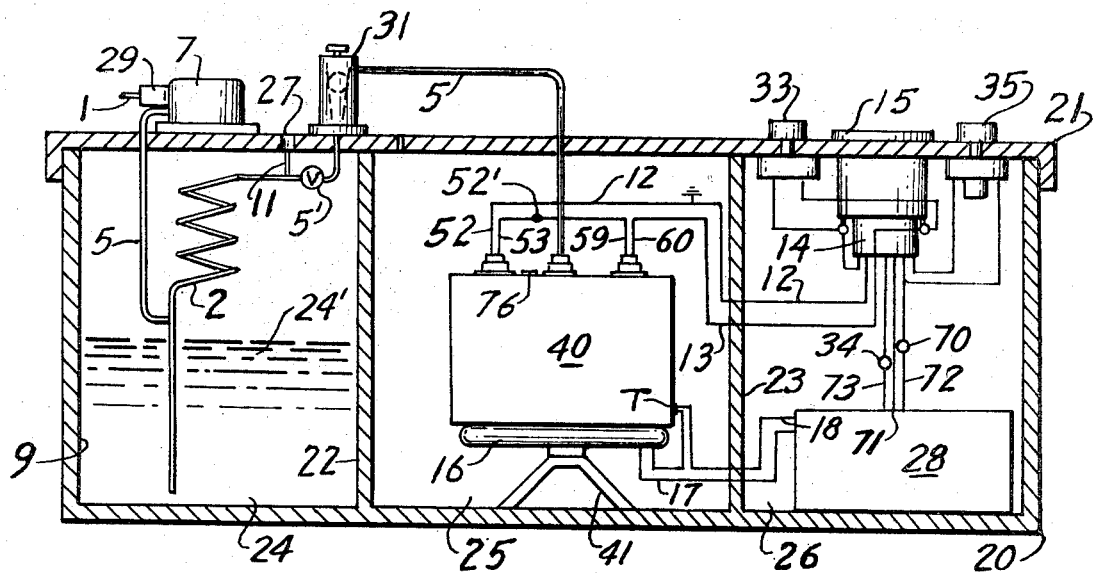
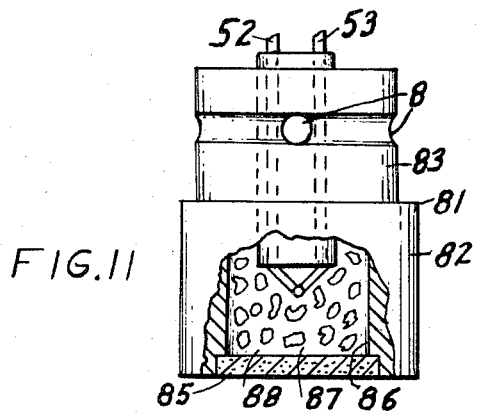
WILLIAM B. INNES
INVENTOR
BY
Earl E. Moore
ATTORNEY

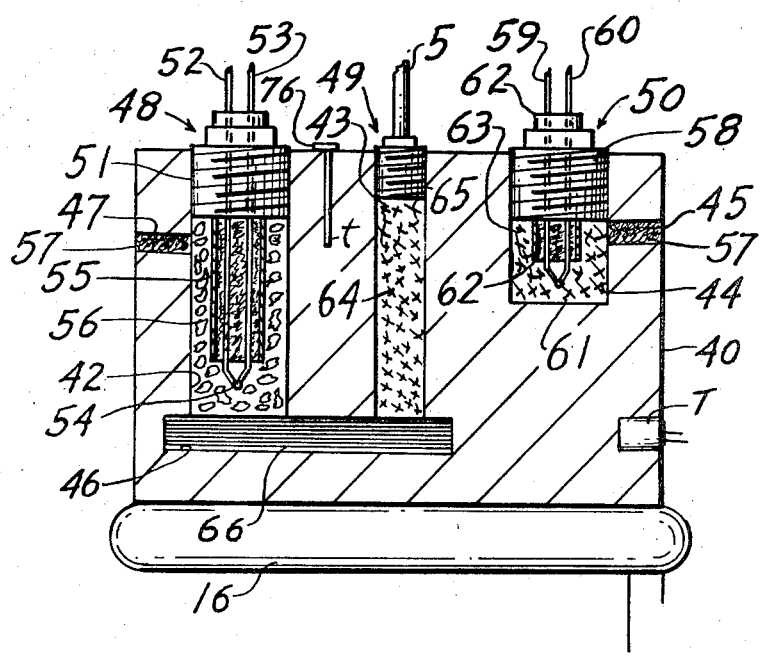
FIG. 7
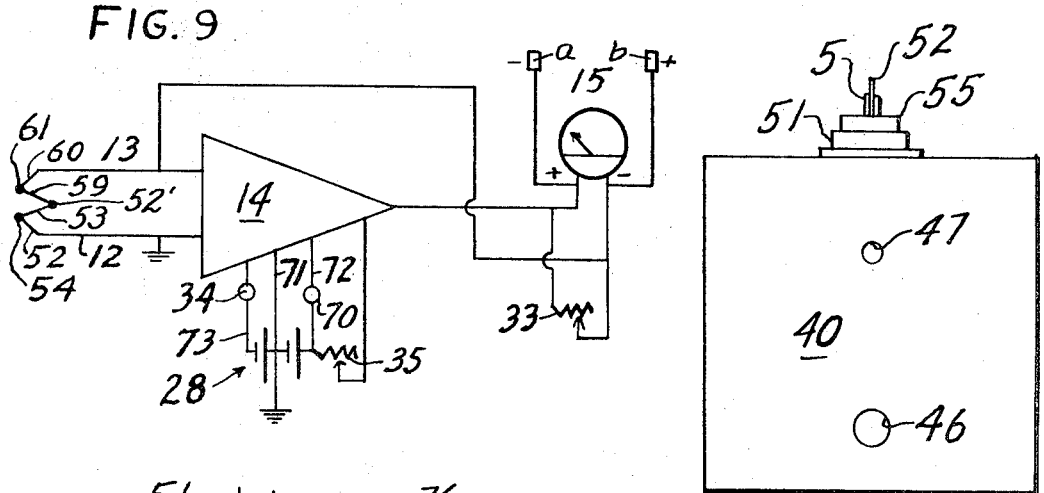
FIG. 9
FIG. 8
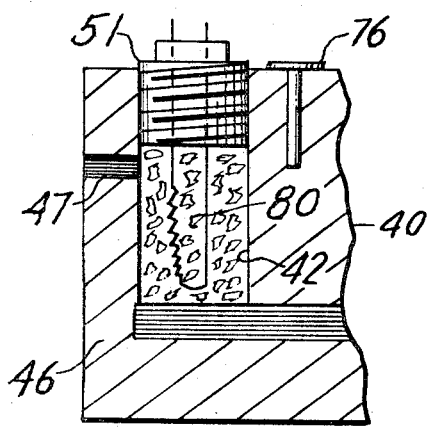
FIG. 10
WILLIAM B. INNES
INVENTOR United States Patent Office 3,547,587
Patented Dec. 15, 1970

3,547,587
MEANS AND METHODS OF RAPID GAS ANALYSIS
William B. Innes, 724 Kilbourne Drive, Upland, Calif. 91786
Continuation-in-part of application Ser. No. 538,503, Feb. 23, 1966. This application Aug. 7, 1967, Ser. No. 658,786
Int. Cl. G01n 33/22, 31/00
U.S. Cl. 23—232                                              8 Claims

ABSTRACT OF THE DISCLOSURE

A system and process for determining the amount of a given constituent in a gas sample is disclosed. Air is passed through a reactive bed with discrete slugs of the sample gas added thereto at spaced intervals. The temperature rise in the bed is measured immediately adjacent the inlet to the bed. Temperature rises less than about 10° C. are directly related to the amount of the constituent in the sample.

This application is a continuation-in-part of pending application Ser. No. 538,503, now abandoned, filed by applicant Feb. 23, in the year of 1966 and entitled "Gas Tester for Smog Constituents."

The invention herein set forth relates in particular to a new approach for utilizing transient heat effects from adsorption and/or chemically reactive processes for gas analysis. The utilization of such heat effects has previously involved continuous sample addition to a steady state temperature. A method of this character is time consuming, and generally requires one to five minutes for steady state conditions to prevail and does not show response from adsorption-desorption phenomena.

The primary objects and aims of this instant invention involves a small sample injection into a carrier gas (if used) and includes:

(1) Rapid response for results;
(2) A small sample requirement of gas to be tested;
(3) Simple flow control and/or means for effecting the gas flow;
(4) Linear response to the component being analysed with respect to both concentration and size of the sample, that, linearity with respect to total mols injected;
(5) Low preheat requirements;
(6) Less catalytic deactivation and catalyst attrition than for the conventional steady state approach because of smaller sample usage and low total flow rate;
(7) Provision of a plurality of reactors in a single transportable container in part and parcel of this invention and it is conceivable that when a plurality of reactors are employed, that they may be connected in series or in parallel depending upon the demands of the trade;
(8) In the case of hydrocarbon analysis, for instance, the ability to tailor the relative response to different hydrocarbons by variation of operating parameters so that the invention gives results approximating other methods used for current infra-red exhaust standards or that they may be used for future standards based on flame ionization and finally when standards are set on the basis of photochemical smog forming potential, the ability to obtain response in line with photochemical reactivity.

Such objectives are of particular importance in applying the invention described herein and in the parent copending application mentioned above for rapid analysis of automobile exhaust for smog forming hydrocarbons using an air type of carrier gas. However, they also apply in large measure to a variety of other gases and cases such as for instance: analysis of carbon monoxide in auto exhaust with a "Hopcalite" catalyst and with an air carrier gas where a particular objective is insensitivity to flow rate and bed temperature. They also would be expected to apply to analysis of oxygen in automobile exhaust with a reducing carrier gas (e.g. $H_2$) and an oxidisable material which may be a copper catalyst. Another application would be the analysis of noxious aldehydes in diesel exhaust with alumina as the reactive material, an air carrier gas and an Ascarite scrubber. Still another application is to $CO_2$ analysis where the heat rise due to adsorption on alumina gives a measure of this constituent when oxy-organics and reactive hydrocarbons are scrubbed out of the inlet stream and CO levels are not high.

Other objects of this invention will become apparent upon perusal of the preamble of the specifications along with the specifications as to details in combination with the illustrations in the drawings.

In the drawings:

FIG. 5 is a hydrocarbon analysis graph showing response up to high levels of carbon compound injection;

FIG. 6 is a vertical and longitudinal sectional view of a portable unit provided with structural means to accomplish desirable ends of the invention;

FIG. 7 is a vertical sectional view of the reactor, the heater, however, being shown in elevational view;

FIG. 8 is an elevational view of one end of the reactor shown in FIG. 7;

FIG. 9 is a schematic showing of the electrical system that may be employed in the invention;

FIG. 10 is a sectional view of a portion of a reactive unit showing a modification; and FIG. 11 is a sectional view of a removable reactive unit made from a pipe plug with a hole bored through the center.

Figure 1:
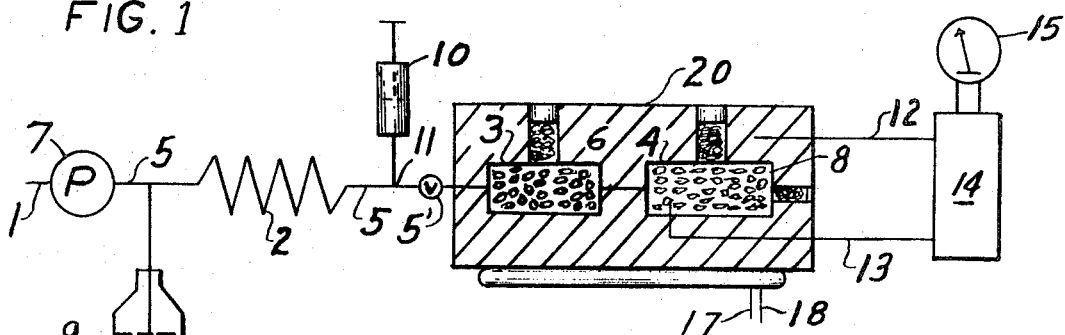
FIG. 1 is a schematic disclosure showing an analyzer which illustrates the general workable form of this invention.

The analyzer shown in schematic and general form in FIG. 1 of the drawings for purposes of easily understanding the invention, admits air at one end thereof and which air enters at 1 and continuously flows through a storage coil indicated at 2, as well as through a preheater 3 and a catalyst bed or reactor 4. The movement of the air (or other carrier gas) is at a fixed rate of about one cubic foot per hour. The duct means or conduit is indicated in general by the reference character 5 and between the preheater and the reactor may be employed the short duct means 6. In the line 5 is shown an aquarium type pump means 7 employed to force air through the system; the air egressing at a suitable location as through a perforated partition-like means at the locus indicated at 8 of the bed 4.

Figure 3:
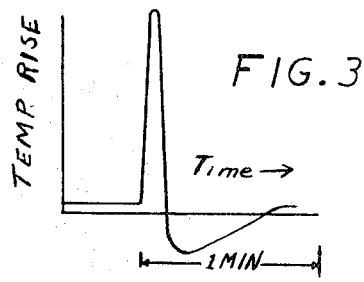
FIG. 3 is another graph showing a typical response curve where adsorption-desorption phenomena are involved.

A typical constant air flow controller means 9 of the water bubbler design is provided as shown and connected to the duct means 5. A syringe 10 having a discharge port is applied at 11 and used for injecting the sample to be tested which is normally in the range of 1–100 cc. and at a rate less than the air flow rate. This slug of injected gas at 11 which may be admixed with some of the air is oxidised by the catalyst in 4 as the mixture flows through the bed and thus resulting in a temperature rise in the reactive bed and this is detected by the differential probes of the lines 12 and 13. This temperature difference is amplified by the operational amplifier housed in 14 and which is read-out on a meter or recorder device 15 to an accuracy of about 0.02 degree C. Alternatively, a fixed volume of sample to be tested may be added from a pressurized stream via a Luerlock fitting at 27, with toggle valve 5' (shown in FIG. 6) closed so as to completely fill the storage coil 2, and then introduced to the reactive or catalyst system by opening toggle valve 5' to the reactor for catalytic oxidation. FIG. 3 shows the typical heat effect from adsorption-desorption.

Figure 2:
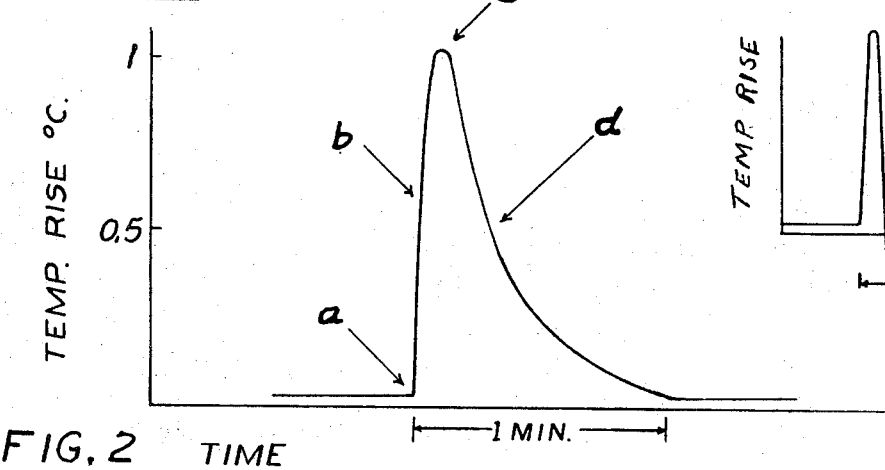
FIG. 2 shows in graphic form a typical response curve.

FIG. 2 shows a typical response curve. The point of sample injection is shown at $a$ and the letter $b$ shows about linear response with time while the slug of injected gas passes along the system. Letter $c$ indicates the peak when heat generated balances the heat dissipated (time of peak slightly greater than injection time) and $d$ is the logarithmic temperature decline due to heat dissipation. The time is one minute. The above shows response curve for hydrocarbons of auto exhaust. Note, that the temperature rises linearly, then levels as it passes through the peak and then there is a decay as a result of heat transfer to cooler parts of the bed, the air stream and the block of material.

FIG. 3 shows a typical response curve where an injected component is adsorbed generating heat and then slowly desorbed causing heat absorption and cooling as the slug passes.

Figure 4:
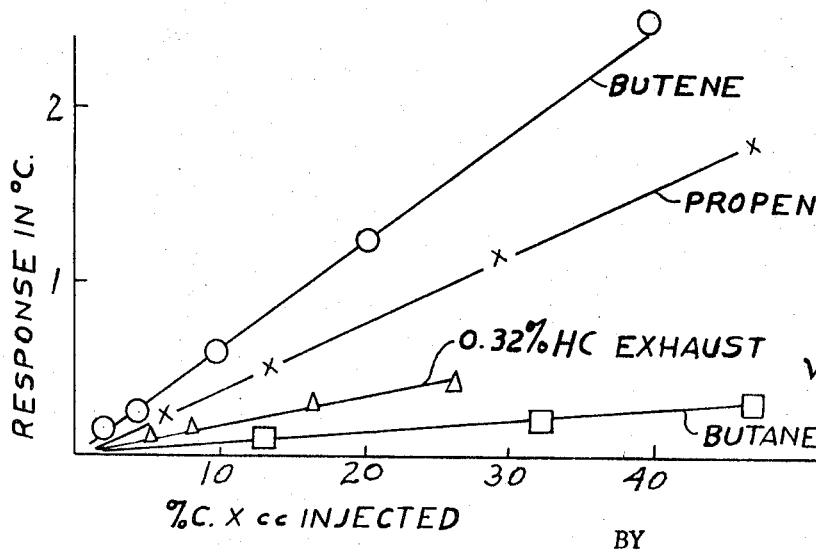
FIG. 4 is a graph showing hydrocarbon analysis response linearity from low to medium levels of carbon compound injection.

The peak values, surprisingly, have been found to be directly proportional to the product of the sample size and concentration of reactive or adsorbed component over a wide range of conditions; that is, to the number of mols injected as illustrated by graphic curves in FIGS. 4 and 5 as well as by the examples.

As shown in FIG. 6, one of the preferred forms, the entire system is placed in a container, carrier or packet 20 and this container has the bottom section with four integral upstanding walls and has a cover means 21. Integral with the bottom section or wall are the upright partitions 22 and 23 which divide the carrier or container into three compartments or chambers 24, 25 and 26. The cover has an opening 27 to accommodate the Luerlock fittings of the syringe 10 (see FIG. 1) which is used for sample gas injection. Obviously, other means may be used.

Chamber 24 provides space for the storage coil 2, a body of liquid 24', associated conduits and the valve means 5'. Chamber 25 houses the reactor 40 (to be later explained) and associated parts thereof including a doughnut type of electric heater means 16 having current feed lines 17 and 18 which lead to a suitable source of electric power which may be a battery or domestic service. The chamber 26 houses the meter 15, its amplifier 14, and also the protective covering means 28 for connection contacts to a power line or a storage type battery. Note, that the line 18 has wires leading to a thermostat T which is placed in the reactor aluminum block and which controls the temperature of the block. The electrical circuit will be explained later.

The cover 21 supports the air pump 7 along with a humidifying means indicated at 29 through which the air must pass from the ingress duct 1 to the pump. The humidifier need be no more than a sponge, supplied with liquid, and housed in a suitable casing. A rotameter 31 is also supported by the cover and this rotameter may be inserted in the line 5, as shown. The cover may also support a rheostat if one is required. The cover supports a gain control 33 and a zero adjustable rheostat 35.

In FIGS. 7 and 8 the reactor is shown in detail and this is an important part of the invention. The reference character 40 indicates an aluminum block which is the support and housing for the reactor. The block may be supported upon a bracket-like means 41 and this fixed rigidly to the bottom of the container. This block is provided with the chambers 42, 43, 44, 45, 46 and 47 which are bores in the block. The chamber 42 accommodates the elements to form the reactor unit 48, chamber 43 forms the ingress unit 49, chamber 44 forms the temperature reference unit 50, chamber 45 forms a passage for removing and inserting material to chamber 44, chamber 46 is a cross passage to conduct gases from chamber 43 to chamber 42, and chamber 47 is an egress passage for gas from chamber 42.

The upper portion of chamber 42 is threaded to receive the threaded plug 51 which has a suitable size bore to accommodate the pair of spaced wires or rods (preferably 24 gauge), the wire 52 being iron and the wire 53 being constantan. These wires are bent together and welded to form the couple and note that the couple is near chamber 46. Stainless steel tubing 55 forms a protecting housing about the wires and extends outwardly beyond the plug and to a point near the couple. Within the tube, Pyrex fiber glass is provided for insulation purposes and to keep the wires in proper position. The chamber 42 is filled with the reactive material which is in granular form. The reactive material may be a mixture of copper and manganese oxides known commercially as Hopcalite which is in an oxidised state to determine carbon monoxide. It may be vanadium oxide in an oxidised state to determine hydrocarbons, methane and ethane.

In any event, the correct reactive material will be employed that reacts best with the particular gas constituent to be measured. The reactive material is indicated in general by the numeral 56. The retaining porous material for various parts is Pyrex wool and this is indicated at 57' for the reactor, 57 for the passage 45 and for passage 47. These two passages may be closed by a suitable plug if so desired if other means of sample gas egress is provided. The reference temperature is obtained in unit 50 wherein the top of chamber 44 is closed by a threaded plug which has a reference character 58.

The unit 50 has the iron and constantan wires or rods 59 and 60 with their lower ends bent to form the junction 61. The wires are protected by the stainless steel tube 62 which is filled with a Pyrex glass fiber sheathing as indicated. The chamber is provided with granular material 63, with suitable thermal properties for balancing out possible effects from small block temperature changes. The unit 49 has its chamber filled with granular aluminum 64 and the top of the chamber is closed by a threaded plug 65 and this plug has a bore therein to accommodate the gas inlet pipe or tube 5. The bottom ends of the chambers 43 and 42 open into the cross passage 46 so that gas can readily flow from chamber 43 into chamber 42. This passage is provided with a plurality of aluminum rods or wires 66 which function to maintain heat conduction and also to provide a simple support for the granulars in the two chambers. The rods 66 are nested together and provide a large plurality of gas passages between their rounded surfaces.

FIG. 9 is presented to merely show a suitable electric circuit means to accomplish desired purposes. Obviously, other circuits could be employed to satisfactorily meet the needs of this invention. The operational amplifier is the type known as Melcor #1618 and connections thereto are clearly shown in FIG. 9. The amplifier 14 is connected to the battery 28 by the wires 71, 72 and 73. The source of current may be any suitable direct current supply such as the battery indicated at 28 or by some rectifier device connected to the regular domestic service. Reference characters *a* and *b* indicate jacks for connection to a suitable recorder. The gain control is shown at 33, the zero control at 35, switches 34 and 70 control battery current, and the junction points of the thermocouples are shown at 52', 54 and 61. Wire 73 is −15 volts with respect to wire 71. The circuit is arranged to detect low voltage from the thermocouple system and amplify same for a reading upon the meter 15. It might be well to mention here, that a thermostat T is provided in the aluminum block 40 so as to maintain the block at a predetermined temperature. Also, a thermometer *t*, 76 is provided to give a reading of the block's temperature.

FIG. 10 shows the same aluminum block 40 and all parts thereof are substantially the same except that the bore 42 has the tungsten resistance wire 80 which is properly insulated to prevent short circuit throughout its length and passes through the bore in the closure plug 51. This method of temperature probing may be preferred in some cases. Two elements are employed, one in the reactive bed and one in the reference bed and the block may be modified so that about half the gas flow is through the reference side in order to balance out other effects related to catalytic activity of the wire or thermal conductivity of the gas. As used herein, the phrase granular reactive material is intended to mean a material in granular form that reacts either catalytically or adsorptively with a component in the gas stream during initial contact therebetween as evidenced by a temperature rise in the reactive material. Also, the wire may be coated to minimize such effects (e.g. with Saurizen cement).

FIG. 11 shows a removable unit on an enlarged scale made from 1/8 inch pipe plug 81; obviously, it could be a 1/4 inch pipe plug or larger. The enlarged base portion 82 is threaded and thus adapted to be inserted in a threaded bore of an aluminum block like that shown in other figures of the drawing. The reduced portion 83 is provided with one or more gas passage holes like 84. The bottom of the plug is recessed to accommodate a gas permeable disc 85 which may be stainless steel provided with many small holes so that gas can pass through the disc. The bore or chamber 86 accommodates the thermocouple means 52–53 junction 88 and the stainless steel protector shield means 55 as explained in the other forms of the invention. In the chamber 86 at the top portion thereof at the hole or holes 84 a packing of Pyrex wool is provided. The balance of the chamber is provided with granular reactive material 87. The plug is made of high heat conductive material which is not subject to significant corrosion under usage conditions. The unit 81 has the advantage of making it easier to replace the reactive bed as required by loss in reactivity and changing analysis requirements, and also makes it easier to precisely place the temperature detection element relative to bed inlet.

This invention as applied to various cases is further illustrated by the following examples.

EXAMPLE I

Hydrocarbon analysis

Effect of positioning of probe

As shown by the data in Table 1, positioning of the temperature probe has been found to be of surprisingly major importance under practical flow conditions (i.e. those dictated by use of an inexpensive aquarium pump-water bubbler carrier gas delivery system). That is, unlike temperature gradients found for steady state operation where the temperature maximum is normally near the exit of the bed, the maximum for practical flow limits (0.2–4.0 liters/min.) and temperature (200–400° C.) for hydrocarbon analysis was found near the inlet. The preferred parameters for hydrocarbon analysis are temperature in the range 200–400° C., flow rate of the sample and carrier gas less than 5.0 s.c.f.h., sample size less than 500 cc., time for sample injection less than 20 seconds and average position of the temperature probe such that there is less than 0.5 cc. of reactive material prior to the probe.

TABLE I.—TEMPERATURE DISTRIBUTION IN DIRECTION OF FLOW THROUGH BED

| Placement of thermocouple junction, inches from start of bed | Injected sample [1] | Millivolt signal [2] | Vol. of catalyst prior to probe, cc. |
|---|---|---|---|
| 0.00 | 10 cc. 1% 1-butene | 13 | .00 |
| 0.02 | do | 25 | .03 |
| 0.06 | do | 14 | .09 |
| 0.12 | do | 9 | .18 |
| 0.20 | do | 4 | .30 |
| 0.50 | do | 1 | .76 |
| 0.00 | 10 cc. 1% n butane | 1.5 | .00 |
| 0.1 | do | 3.0 | .15 |
| 0.15 | do | 3.0 | .23 |
| 0.25 | do | 2.9 | .38 |
| 0.50 | do | 2.5 | .76 |

[1] See Fig. 1. Air flow rate through catalyst bed (20–40 mesh vanadia-alumina) 325 cc./min., block temp. 318° C.
[2] Relative change in temperature as read from amplified thermocouple signal using 24 gauge iron-constantan. Average readings at edge, middle and center with respect to axis of .32″ diameter bed of vanadia-alumina catalyst (20–40 mesh).

Also, it is evident that relative peak response for reactive hydrocarbons (e.g. butene) vs. non-reactive hydrocarbons (e.g. butane) is higher near the inlet which is very desirable for a hydrocarbon analyzer designed to primarily indicate the reactive "smog forming" hydrocarbons. In addition, the time to reach peak values for reactive hydrocarbons like butylene is lower in the inlet portion of the bed as shown in Table II.

TABLE II.—EFFECT OF "DISTANCE" THROUGH BED ON PEAK TIME [1]

| Placement of thermocouple junction, inches from start of bed | Injected sample | Minutes for peak | Vol. of cat. prior to probe, cc. |
|---|---|---|---|
| .05 | 10 cc. 1 butene | 0.10 | .076 |
| .10 | do | 0.22 | .335 |
| .20 | do | 0.45 | .69 |
| .50 | do | 0.60 | .91 |

[1] Same conditions as listed for Table I.

Effect of flow rate

Table III illustrates that flow rate for sample addition, unlike analysis at steady state conditions, is not a critical factor.

TABLE III

| Injected material | Seconds from injection for peak [1] | Response peak mv.×10 [2] |
|---|---|---|
| 50 cc. automobile exhaust from bag | 5 | 8 |
| Do | 8 | 9 |
| Do | 12 | 9 |
| Do | 18 | 8 |
| Do | 20 | 8 |
| Do | 21 | 8 |
| Do | 33 | 6 |
| Do | 45 | 5 |

[1] A measure of rate of sample addition.
[2] Same system as for Table V, flow rate through bed=1 c.f.h., bed temp.=300° C., bridge voltage=3.7.

EXAMPLE 2

Other data on probe position involving temperature measurement with probes that served to indicate average temperature over a range of distances from the inlet were also carried out as shown in Tables IV and V.

TABLE IV.—ILLUSTRATIVE DATA OBTAINED USING MULTIPLE JUNCTION[1] THERMOCOUPLE DETECTOR SYSTEM

| Sample | | | Response, |
|---|---|---|---|
| Nature | Mol percent | Vol., cc. | millivolts |
| n-Butane | 5 | 5 | 38 |
| Propylene | 2 | 5 | 60 |
| Butylene | 1 | 5 | 70 |

[1] Three probes in series placed at .05 cc., 0.5 and 0.8 cc. from inlet of vanadia-alumina catalyst bed. Diameter of bed=.33 in.
[2] Results stayed constant over a period of weeks indicating insensitivity to changes in conditions and good life properties.
[3] After amplification (300 gain). Flow rate: 1.2 cu.ft./hr. (c.f.h.). Bed temp.: 300° C.

TABLE V.—DATA OBTAINED WITH TUNGSTEN WIRE RESISTANCE ELEMENTS IN WHEATSTONE BRIDGE[1]

| Sample injected | | | Air flow rate,[2] cc./min. | Bed temp., °C. | Response, millivolts |
|---|---|---|---|---|---|
| Nature | Cc. | Mol percent | | | |
| n-Butane | 5 | 1 | 500 | 305 | 0.8 |
| | | | 800 | | 0.45 |
| | | | 1,150 | | 0.15 |
| | | | 500 | 256 | 0.17 |
| | | | 800 | | 0.10 |
| | | | 1,150 | | 0.01 |
| n-Hexane | 5 | 0.75 | 500 | 305 | 2.4 |
| | | | 800 | | 1.7 |
| | | | 1,150 | | 1.1 |
| | | | 500 | 256 | 1.0 |
| | | | 800 | | 0.7 |
| | | | 1,150 | | 0.4 |
| Propylene | 5 | 2.3 | 500 | 305 | 3.1 |
| | | | 800 | | 2.1 |
| | | | 1,150 | | 1.7 |
| | | | 500 | 256 | 1.3 |
| | | | 800 | | 0.9 |
| | | | 1,150 | | 0.6 |
| Isobutene | 5 | 1.08 | 500 | 305 | 2.8 |
| | | | 800 | | 2.9 |
| | | | 1,150 | | 2.9 |
| | | | 500 | 256 | 1.9 |
| | | | 800 | | 2.2 |
| | | | 1,150 | | 2.1 |
| Rambler idle exhaust | 20 | 100 | [3] 500 | 305 | 1.1 |
| | | | 500 | | 0.9 |
| | | | 800 | | 1.2 |
| | | | 1,150 | | 1.2 |
| | | | 500 | 256 | 1.0 |
| | | | 800 | | 1.0 |
| | | | 1,150 | | 0.9 |

[1] Bridge current: 190 milliamps, Gow-Mac resistance elements (40 ohms at 25° C.).
[2] Half of flow through bed of inert material. Moisture content of air reasonably close to that of sample gas except where indicated. Reference element in bed of inert material.
[3] Dry air and wet exhaust gas used.

Apart from showing the relative response to various hydrocarbons and the effect of flow rate and bed temperature on response, Table V shows an effect from water vapor in auto exhaust when dry air is used as a carrier gas. This problem was eliminated by humidifying the air supply such as by surrounding the inlet air pump with a wet sponge when testing water vapor saturated auto exhaust. It is thought that the problem is related to heat of adsorption of moisture by the catalyst.

EXAMPLE 3

Carbon monoxide analysis

Hopcalite is a well known low temperature catalyst for the oxidation of carbon monoxide. Therefore, this invention was applied to CO analysis with a commercial Hopcalite catalyst from Purolator Products Inc. utilizing the method of this invention. In the case of CO in exhaust gas, some of the more reactive hydrocarbons also undergo oxidation under operating conditions so that it is preferable to utilize a small charcoal scrubber ahead of the reactor although the interference is often negligible. Illustrative data are given in Table VI and show linear response to mols of injected CO and negligible response to other components in auto exhaust. Table VII shows the effect of operating parameters and indicates higher and more rapid response from CO when the probe is placed closer to the optimum position for this invention; that is, near the inlet. The preferred temperature lies in the range 35–140° C.

TABLE VI.—ILLUSTRATION OF APPLICATION FOR CO ANALYSIS

| Room air flow rate, c.f.h. | Nature of sample | Sample size, cc. | Peak response, mv. | Specific response, mv./cc. pure CO | Time for peak, min. |
|---|---|---|---|---|---|
| 1.1 | 15% CO$_2$ in air | 5 | 0 | 0 | |
| 1.1 | 10% CO in air | 5 | 60 | 120 | 0.2 |
| 1.1 | 5% CO in air | 5 | 35 | 130 | 0.2 |
| 1.1 | 5% CO in air | 10 | 68 | 136 | 0.2 |
| 1.1 | 2.5% CO in air | 5 | 15 | 121 | 0.2 |
| 1.1 | 1% butene | 5 | 0 | | |
| 1.1 | 20% H$_2$ in air | 5 | 2 | | |
| 1.1 | Saturated water vapor | 10 | 0 | | |

NOTE: Other conditions as follows: amplifier 500 mv. output/mv. from thermocouple system, .34″ diam. bed of commercial Hopcalite catalyst from Purolator, 24 gauge iron-constantan thermocouple temperature probes with hot junction placed 0.15″ from inlet bed (0.2 cc. of catalyst prior to probe), block temperature 95° C., scrubber after injection before reactor, 40 cc. activated carbon.

TABLE VII.—APPLICATION TO CO ANALYSIS

Effect of Operating Parameters on Response From CO

| Probe position, in. from inlet | Bed temp., °C. | Flow rate, c.f.h. | Specific peak response, mv./cc. CO | Peak time, min. | Vol. of cat. ahead of probe, cc. |
|---|---|---|---|---|---|
| .15 | 95 | 1.1 | 130 | .20 | .23 |
| .02 | 95 | 1.1 | 220 | .15 | .03 |
| .02 | 98 | 1.1 | 210 | | .03 |
| .02 | 76 | 1.1 | 265 | | .03 |
| .02 | 72 | 1.1 | 370 | | .03 |
| .02 | 59 | 1.1 | 268 | | .03 |
| .02 | 75 | 1.1 | 268 | | .03 |
| .02 | 75 | 1.7 | 310 | | .03 |
| .02 | 75 | [1] 2.1 | [1] 340 | | .03 |
| .02 | 75 | 2.1 | 315 | | .03 |
| .02 | 114 | 0.8 | 125 | | .03 |
| .02 | 114 | 1.1 | 225 | | .03 |
| .02 | 114 | 1.5 | 290 | | .03 |
| .02 | 114 | 1.85 | 290 | | .03 |

[1] Charcoal scrubber deleted.

NOTE: Other conditions except for bed temperature same as for Table VI except where otherwise indicated.

The results indicate generally satisfactory operation over a wide range of flow rates and bed temperature. Peak response appears high and particularly insensitive to flow rate from 0.5 to 2.0 c.f.h. and 70–114° C. so that these ranges appear preferable for normal operation with temperature probe near the inlet.

Studies on the effect of bed diameter, Table VIII, show that smaller diameter beds can be used to decrease recovery time while still achieving satisfactory sensitivity under optimum conditions for exhaust analysis. With smaller diameter beds, probes need not be placed so close to the inlet and optimum bed temperature is lower although maximum response is also lower. Recovery time decreases with decrease in bed diameter.

TABLE VIII.—APPLICATION TO CARBON MONOXIDE ANALYSIS

Effect of Reaction Chamber Diameter and Probe Position

| Probe distance from inlet, inches | Bed diameter, inches | Optimum conditions | | | Peak temp. rise, °C./cc. CO | Time factors | | Cat. vol. prior to probe, cc. |
|---|---|---|---|---|---|---|---|---|
| | | Flow rate, c.f.h. | Bed temp., °C. | | | Time to peak, min. | Recovery Time [2] min. | |
| .05 | .187 | 1.2 | 87 | 8.6 | .10 | .75 | .02 | |
| .25 | .250 | 1.1 | 63 | 6.7 | .15 | 1.00 | .08 | |
| .15 | .330 | [3] 1.1 | [3] 95 | 4.3 | .20 | 1.5 | .23 | |
| .02 | .330 | 1.1 | 95 | 7.3 | .15 | 1.5 | .03 | |

[1] As determined primarily by maximum response and insensitivity of response to change in these parameters.
[2] To 5% of peak value as measured from baseline.
[3] Not enough data to establish optimum conditions.

EXAMPLE IV

Carbon dioxide analysis

Active alumina even after acid leaching to remove possible reactive alkaline and iron impurities was surprisingly found to be a suitable agent for detecting carbon dioxide with this system. The phenomena was clearly due to heat effects from adsorption rather than catalytic oxidation as shown by a response curve like FIG. 3 and the known fact that $CO_2$ cannot be oxidised. Data are given in Table IX. The preferred temperature lies in the range 200–400° C. and other reactive constituents in the sample are preferably removed prior to passing the sample and carrier gas through the reactive granular material.

TABLE IX.—APPLICATION TO CARBON DIOXIDE ANALYSIS

| Injected sample size, cc. | Sample | | Peak millivolt response [c] | Calculated temp. rise, °C. |
|---|---|---|---|---|
| | Percent $CO_2$ [a] | Percent CO [a] | | |
| 20 | 3.1 | 0 | 6 | .06 |
| 20 | 6.2 | 0 | 10 | .10 |
| 20 | 12.5 | 0 | 18 | .19 |
| 20 | 25 | 0 | 27 | .28 |
| 20 | 50 | 0 | 40 | .42 |
| 20 | 100 | 0 | 80 | .83 |
| 40 | 12.5 | 0 | 28 | .28 |
| 20 | 0 | 20 | 4 | .04 |

[a] Air diluent used.
[b] Conditions as follows:
  Active bed=high alumina surface area acid leached Kaiser Grade 101. Bed temperature=247° C. Air flow rate through alumina bed=450 cc./min. Alumina prior to probe=1.5 cc.
[c] Measured with 6 thermocouple junctions at same distance from bed vs. 6 reference junctions in inert bed and amplified 300/1. Response typical for adsorption as shown in Fig. 3.

Peak response like catalytic oxidation is near linear with respect to total mols of $CO_2$ injected under test conditions.

Application of the method with this alumina to engine exhaust streams normally containing about 13% $CO_2$ would require a small correction if CO were present as shown by a small response resulting from some catalytic oxidation of this component. In the case of diesel exhaust and gasoline engines with high air/fuel ratio, CO levels are under 1% and interference should be negligible. Organics (particularly aldehydes as shown in Table XI) can also interfere, but these can be scrubbed out with charcoal if necessary and organic levels in most streams are low enough so that the problem is not serious.

Placement of probe would not be expected to have much effect on results when adsorption heats are involved since the whole bed acts to adsorb and desorb as the pulse passes, thus generating similar heat effects throughout the reactive bed.

EXAMPLE V

Aldehyde-ketone analysis

Eye irritation, odor and other unpleasant effects are associated with many aldehydes. Their further degradation by photochemical means can lead to other smog manifestations. Although they are only found in small concentrations in engine exhaust except during deceleration, they are probably the main cause of nauseous odors that are observed on congested highways. Diesel exhaust is worse in this respect than gasoline engine exhaust. An instrument that rapidly and selectively detects these components would be of considerable value in control and research measures to reduce this source of air pollution.

The same active alumina utilized for $CO_2$ analysis was found to be surprisingly selective relative to hydrocarbons in detecting aldehydes and ketones. If $CO_2$ is also present in appreciable concentrations, as is the case of vehicle exhaust, it is necessary to scrub out this component with a suitable absorbent such as Ascarite (supported sodium hydroxide).

Results obtained are shown in Table X. The response curves for the aldehydes and ketones studied are like FIG. 2 suggesting catalytic combustion rather than adsorption-desorption phenomena. It is presumed, therefore, that higher responses for these components would have been observed like Table II for hydrocarbons if the probe had been closer to the bed inlet so that further improvement in selectivity could probably be realized. The relatively high response per mol of formaldehyde is a particularly important observation since this compound is believed to be the most important eye irritant as well as odor constituent from vehicle air pollution. The preferred temperature is in the range 200–400° C.

TABLE X.—APPLICATION TO ALDEHYDE-KETONE ANALYSIS AND RESPONSE TO OTHER ORGANICS [1] IN ENGINE EXHAUST

| Component | Concentration, vol. percent [2] | Sample size, cc. | Peak response, mv. | Calculated temp. rise °C. | Ratio temp. rise to cc. pure component |
|---|---|---|---|---|---|
| Acetone | 1.1 | 20 | 30 | .32 | 1.5 |
| Methyl alcohol | 16.0 | 20 | 15 | .16 | 0.5 |
| Formaldehyde | 0.2 | 20 | 16 | .17 | 4.3 |
| Isobutene | 1.0 | 20 | 0 | .00 | 0.0 |
| Saturated gasoline vapor (26° C.) | 20.0 | 20 | 2.5 | .02 | 0.00 |
| Same as above | 100.0 | 20 | 11.5 | .11 | 0.00 |
| Hexane | 20.0 | 20 | 13.0 | .14 | 0.03 |
| Idle auto exhaust [3] | 100 | 50 | 2.0 | .02 | |
| Cruise auto exhaust [3] | 100 | 50 | 2.0 | .02 | |
| Deceleration auto exhaust [3] | 100 | 50 | 5.0 | .06 | |

[1] Conditions as follows:
  Active bed=high surface area acid leached Kaiser alumina Grade 101.
  Bed temp.=246° C.
  Air flow rate through bed=225 cc./min.
  Alumina prior to temperature probe=1.5 cc.
[2] Diluted with room air before injection.
[3] Ascarite tube after injection point to scrub out $CO_2$ and $H_2O$.

Certain novel features, methods and details of this invention are disclosed herein, and in some cases in considerable detail, and this in order to make the entire invention clear in at least one or more forms thereof. It is submitted, however, that it is to be clearly understood that the invention, as disclosed, is not necessarily limited or confined to the exact form or forms and details disclosed for the reason that it should be apparent that various modifications, adaptations and changes may be made without truly departing from the spirit and scope of the invention and especially as the invention is expressed in the claims.

Having thus described my invention, what is claimed as new and desired to be secured by United States Letters Patent is:

1. A system for determining the amount of a given constituent in a gas sample comprising, in a series arrangement, a pump for passing air through the system, a pressure regulator, an accumulator, a sample injection port, and a temperature controlled heat conductive block comprising a preheating section and a reactor section having therein a quantity of granular reactive material defining a flow path having an inlet and outlet, and a temperature detector in the granular reactive material immediately adjacent the flow path inlet to detect temperature rise and thereby indicate the amount of constituent being analyzed in the injected sample.

2. The system of claim 1 comprising reactive material holding means including a plug removably secured to the heat conductive block and extending into the reactor section, the plug comprising a central cavity, a gas permeable entry member providing communication to the cavity, and gas exit means, the granular reactive material being received in the central cavity and the temperature detector being located immediately adjacent the gas permeable entry member.

3. A system for determining the amount of a given constituent in a gas sample comprising
   a preheating vessel;
   a reactor vessel having therein a quantity of granular reactive material defining a flow path therethrough having an inlet and an outlet;
   means for controlling the temperature of the preheating vessel and the reactor vessel to the same predetermined temperature;
   means for passing a carrier gas through the preheating vessel and then through the reactor vessel;
   means for regulating the pressure of the carrier gas;
   means for injecting a sample gas into the carrier gas;
   means for maintaining the flow rate through the vessels substantially constant. and
   a temperature detector in the granular reactive material immediately adjacent the inlet to detect temperature rise and thereby indicate the amount of constituent being analyzed in the injected sample.

4. A process for selectively determining the amount of a given constituent in a sample of exhaust gas from hydrocarbon fuel combustion processes by
   passing 0.2 to 20.0 s.c.f.h. of a carrier gas high in oxygen relative to reducing components through a permeable granular bed of reactive material at a predetermined temperature for stabilizing the reactive component of the granular bed, the constituent being any from the first column and the reactive component corresponding thereto being from the second column:

Carbon monoxide __ Hopcalite catalyst.
   Carbon dioxide ____ Aluminum oxide adsorbent.
   Hydrocarbons _____ Vanadium oxide catalyst.
   Aldehydes _____ Aluminum oxide catalyst.

adding a sample of exhaust gas to the carrier gas upstream of the granular bed for a period up to approximately 30 seconds while maintaining a substantially constant flow rate, the sample size being selected to produce up to about a 10° C. rise in the temperature in the reactive material;
   regulating the temperature of the carrier stream and the exhaust gas sample to substantially the same predetermined temperature;
   then passing the exhaust gas sample and carrier gas stream through the reactive material; and
   measuring the maximum temperature rise less than about 10° C. in the granular bed immediately adjacent the initial contact of the exhaust gas sample and the reactive material to obtain a measure of the given constituent present in the exhaust gas sample.

5. The process of claim 4 for carbon monoxide analysis wherein the predetermined temperature is in the range 35–140° C.

6. The process of claim 4 for carbon dioxide analysis wherein the predetermined temperature is in the range 200–400° C. and further comprising the step of removing other reactive constituents from the sample before passing the sample and carrier gas stream through the reactive material.

7. The process of claim 4 for aldehydes wherein the predetermined temperature is in the range 200–400° C.

8. The process of claim 4 wherein the maximum temperature rise is measured at a location less than 0.5 cc. of catalyst volume from the inlet.

References Cited

UNITED STATES PATENTS

| | | | |
|---|---|---|---|
| 1,578,666 | 3/1926 | Katz | 23—232 |
| 2,531,592 | 11/1950 | Yant et al. | 23—232 |
| 2,751,281 | 6/1956 | Cohn | 23—232X |
| 2,826,908 | 3/1958 | Skarstrom | 23—255X |
| 2,899,281 | 8/1959 | Oliver | 23—232X |
| 2,916,358 | 12/1959 | Valentine et al. | 23—232X |
| 3,025,132 | 3/1962 | Innes | 23—288.3X |
| 3,095,278 | 6/1963 | Green | 23—232X |
| 3,100,140 | 8/1963 | Ashley et al. | 23—288.3 |

JOSEPH SCOVRONEK, Primary Examiner

U.S. Cl. X.R.

23—2, 255, 288

UNITED STATES PATENT OFFICE
CERTIFICATE OF CORRECTION atent No. 3,547,587                   Dated   December 15, 1970 nventor(s) William B. Innes

It is certified that error appears in the above-identified patent nd that said Letters Patent are hereby corrected as shown below:

Col. 1, line 38:  Change "objects" to --objectives--.

Col. 1, line 47:  Change ", that," to --; that is,--.

Col. 1, line 53:  Change "in" to --is--.

Col. 1, line 61:  Change "that they may" to --that may--.

Col. 5, line 33:  Change "from 1/8" to --from a 1/8--.

Col. 7, Table IV, 4th heading:  Change "Response," to --Response,$^2$--.

Col. 7, Table IV, 4th heading:  Change "millivolts" to --Millivolts$^3$--.

Col. 7, Table V, 2nd heading:  Change "Cc." to --cc.--.

Col. 8, Table VII, 2nd heading, 8th line:  Change "98" to --89--.

Col. 9, Table VIII, 3rd heading:  Change "Optimum Conditions" to --Optimum Conditions$^1$--.

Col. 9, Table IX, 5th heading, line 12:  Change ".28" to --.29--.

Col. 11, line 52:  Change "substantially constant. and" to --substantially constant; and--.

UNITED STATES PATENT OFFICE
CERTIFICATE OF CORRECTION

Patent No. 3,547,587      Dated December 15, 1970

Inventor(s) William B. Innes      PAGE - 2

It is certified that error appears in the above-identified patent and that said Letters Patent are hereby corrected as shown below:

Col. 12, line 8: Change "catalyst." to --catalyst--.

Col. 12, line 9: Change "adsorbent." to --adsorbent--.

Col. 12, line 10: Change "catalyst." to --catalyst--.

Col. 12, line 11: Change "catalyst." to --catalyst;--.

Signed and sealed this 6th day of April 1971.

(SEAL)
Attest:

EDWARD M. FLETCHER, JR.      WILLIAM E. SCHUYLER, JR.
Attesting Officer      Commissioner of Patents